United States Patent [19]
Markandey et al.

[11] Patent Number: 5,504,504
[45] Date of Patent: Apr. 2, 1996

[54] METHOD OF REDUCING THE VISUAL IMPACT OF DEFECTS PRESENT IN A SPATIAL LIGHT MODULATOR DISPLAY

[75] Inventors: Vishal Markandey, Dallas; Robert J. Gove, Plano, both of Tex.

[73] Assignee: Texas Instruments Incorporated, Dallas, Tex.

[21] Appl. No.: 275,057

[22] Filed: Jul. 13, 1994

[51] Int. Cl.$^6$ ............................................. G09G 5/00
[52] U.S. Cl. ............................ 345/214; 345/138; 345/55
[58] Field of Search ............................ 345/214, 87, 904, 345/101, 138, 55; 359/84, 86, 85; 348/246, 247, 616, 615, 607; 382/252

[56] References Cited

U.S. PATENT DOCUMENTS

| | | | |
|---|---|---|---|
| 4,600,946 | 7/1986 | Levine | 348/246 |
| 5,274,224 | 12/1993 | Paujois | 345/87 |
| 5,381,175 | 1/1995 | Sudo et al. | 348/246 |

FOREIGN PATENT DOCUMENTS

91/15843  10/1991  WIPO .

Primary Examiner—Richard Hjerpe
Assistant Examiner—Doon Chow
Attorney, Agent, or Firm—Charles A. Brill; James C. Kesterson; Richard L. Donaldson

[57] ABSTRACT

A method and display system for reducing the visual impact of defects present in an image display. The display includes an array of pixels, each non-defective pixel being selectively operable in response to input data by addressing facilities between an "on" state, whereat light is directed onto a viewing surface, and an "off" state, whereat light is not directed onto the viewing surface. A defect is the result of a defective pixel which does not respond to the input data presented by the addressing facilities, typically by continuously remaining in its "on" or "off" state. Each defective pixel is immediately surrounded by a first ring of compensation pixels adjacent to the central defective pixel. The compensation pixels are immediately surrounded by a second ring of reference pixels spaced from the central defective pixel. The addressing circuit-determined value of at least one compensation pixel in the first ring surrounding the defective pixel is changed to a corrective value, in order to reduce the visual impact of the defect.

23 Claims, 8 Drawing Sheets

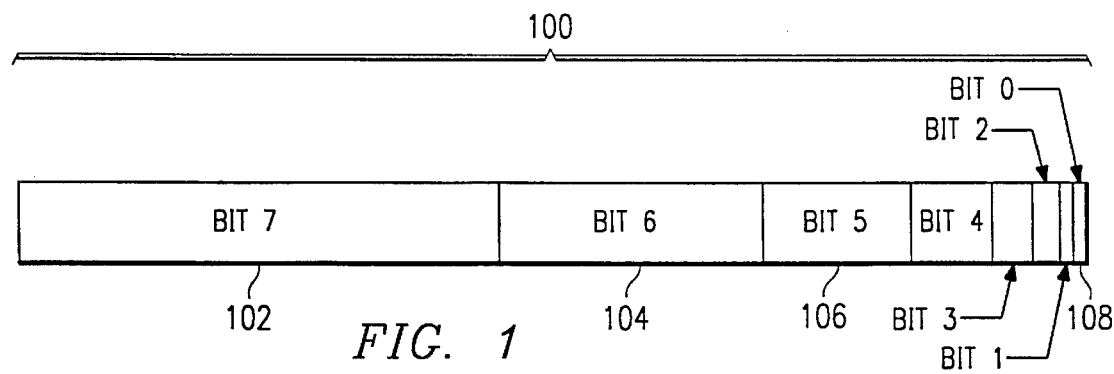

FIG. 11

|   | 1   | 2   | 3   | 4   | 5   |
|---|-----|-----|-----|-----|-----|
| A | 180 | 180 | 180 | 180 | 180 |
| B | 180 | 164 | 164 | 164 | 180 |
| C | 180 | 164 | 255 | 164 | 180 |
| D | 180 | 164 | 164 | 164 | 180 |
| E | 180 | 180 | 180 | 180 | 180 |

FIG. 12

|   | 1   | 2   | 3   | 4   | 5   |
|---|-----|-----|-----|-----|-----|
| A | 180 | 180 | 180 | 180 | 180 |
| B | 180 | 234 | 234 | 234 | 180 |
| C | 180 | 234 | 0   | 234 | 180 |
| D | 180 | 234 | 234 | 234 | 180 |
| E | 180 | 180 | 180 | 180 | 180 |

FIG. 13

|   | 1   | 2   | 3   | 4   | 5   |
|---|-----|-----|-----|-----|-----|
| A | 121 | 128 | 128 | 187 | 200 |
| B | 124 | 128 | 128 | 193 | 200 |
| C | 128 | 128 | 128 | 200 | 200 |
| D | 128 | 128 | 148 | 200 | 200 |
| E | 128 | 128 | 191 | 200 | 207 |

FIG. 14

|   | 1   | 2   | 3   | 4   | 5   |
|---|-----|-----|-----|-----|-----|
| A | 121 | 128 | 128 | 187 | 200 |
| B | 124 | 101 | 101 | 166 | 200 |
| C | 128 | 101 | 255 | 173 | 200 |
| D | 128 | 101 | 121 | 173 | 200 |
| E | 128 | 128 | 191 | 200 | 207 |

FIG. 15

|   | 1   | 2   | 3   | 4   | 5   |
|---|-----|-----|-----|-----|-----|
| A | 121 | 128 | 128 | 187 | 200 |
| B | 124 | 155 | 155 | 220 | 200 |
| C | 128 | 155 | 0   | 227 | 200 |
| D | 128 | 155 | 175 | 227 | 200 |
| E | 128 | 128 | 191 | 200 | 207 |

FIG. 16

|   | 1   | 2   | 3   | 4   | 5   |
|---|-----|-----|-----|-----|-----|
| A | 121 | 128 | 128 | 187 | 200 |
| B | 124 | 108 | 108 | 173 | 200 |
| C | 128 | 108 | 255 | 180 | 200 |
| D | 128 | 108 | 128 | 180 | 200 |
| E | 128 | 128 | 191 | 200 | 207 |

|   | 1 | 2 | 3 | 4 | 5 |
|---|---|---|---|---|---|
| A | 121 | 128 | 128 | 187 | 200 |
| B | 124 | 162 | 162 | 227 | 200 |
| C | 128 | 162 | 0 | 234 | 200 |
| D | 128 | 162 | 182 | 234 | 200 |
| E | 128 | 128 | 191 | 200 | 207 |
*FIG. 17*
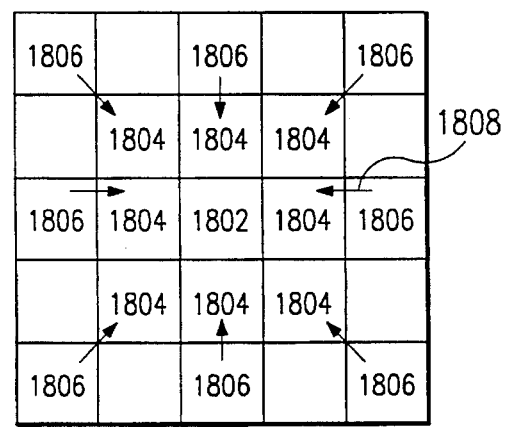
*FIG. 18*
|   | 1 | 2 | 3 | 4 | 5 |
|---|---|---|---|---|---|
| A | 121 | 128 | 128 | 187 | 200 |
| B | 124 | 101 | 101 | 177 | 200 |
| C | 128 | 101 | 255 | 188 | 200 |
| D | 128 | 101 | 134 | 190 | 200 |
| E | 128 | 128 | 191 | 200 | 207 |
*FIG. 19*
|   | 1 | 2 | 3 | 4 | 5 |
|---|---|---|---|---|---|
| A | 121 | 128 | 128 | 187 | 200 |
| B | 124 | 155 | 155 | 235 | 200 |
| C | 128 | 155 | 0 | 242 | 200 |
| D | 128 | 155 | 189 | 244 | 200 |
| E | 128 | 128 | 191 | 200 | 207 |
*FIG. 20*
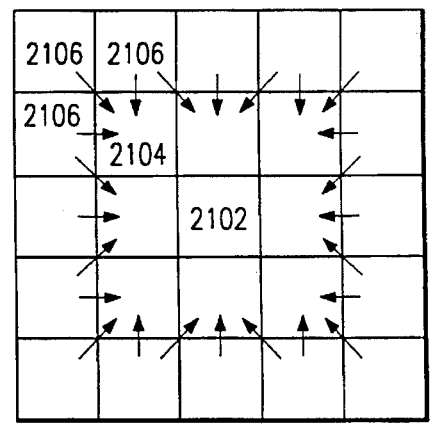
*FIG. 21*

|   | 1 | 2 | 3 | 4 | 5 | 6 | 7 | 8 |
|---|---|---|---|---|---|---|---|---|
| A | 180 | 180 | 180 | 180 | 180 | 180 | 180 | 180 |
| B | 180 | 164 | 164 | 164 | 218 | 218 | 218 | 180 |
| C | 180 | 164 | 255 | 202 | 255 | 0 | 218 | 180 |
| D | 180 | 164 | 164 | 202 | 0 | 255 | 218 | 180 |
| E | 180 | 180 | 180 | 218 | 218 | 218 | 180 | 180 |
| F | 180 | 180 | 180 | 180 | 180 | 180 | 180 | 180 |

METHOD OF REDUCING THE VISUAL IMPACT OF DEFECTS PRESENT IN A SPATIAL LIGHT MODULATOR DISPLAY

FIELD OF THE INVENTION

The present invention relates to a method of reducing the visual impact of defects present in a spatial light modulator ("SLM") display, and, more particularly, to a method of ameliorating the visual impact on an observer of improperly operating mirrors of a digital micromirror device (DMD) or deformable mirror device (also DMD) SLM, which improper operation results from one or more mirrors occupying an incorrect position, namely a reflective ("on") position when the proper position is non-reflective ("off") or vice versa.

BACKGROUND

There are at least four genera of SLM's: electro-optic, magneto-optic, liquid crystal and DMDs. The latter genus, DMDs, includes a micromechanical array of electronically addressable mirror elements. The mirror elements are reflectors each of which is individually movable. Each mirror is a light reflecting pixel and is capable of mechanical movement in response to an electrical input. Light incident on each mirror may be modulated in its direction (or phase) by reflection from each mirror. To date, DMD SLMs have found use in applications such as optical correlation, spectrum analysis, crossbar switching, frequency excision, display projection, printing and neural networks.

There are several species of the genus "DMD SLM", including elastomer type, membrane type as well as cantilever-beam, torsion-beam, and flexure-beam types. Selective control, or addressing, of the DMD SLM pixels has been achieved by electron-beam input, optically or, as preferred today, by circuitry integrated onto the DMD substrate.

Each pixel of the DMD SLM array reflects incident light along a path which depends on the position or orientation of the pixel. Typically, each mirror is movable or deflectable between a normal, first position or orientation and one or more second positions or orientations. In only one position, either the normal position or one of the second positions, a mirror directs the incident light along a selected path to a primary light-receiving site, for example, into an optical system and from there onto a viewing surface or a photosensitive drum. In all other pixel positions, incident light is not directed along the selected path to the primary site; rather, it is directed along another path to either a secondary site or to a "light sink" which absorbs or eliminates the light.

A DMD may take the form of a square, or nearly square, array of mirrors. In this event, the positions of the pixels, each of which is individually controllable by associated addressing facilities, may be altered to generate a video presentation. See commonly assigned U.S. Pat. Nos. 5,079,544; 5,061,049; 4,954,789; 4,728,185 and 3,600,798. See also U.S. Pat. Nos. 4,356,730; 4,229,732; 3,896,338 and 3,886,310. The mirror array may also take other forms, for example, that of a linear array or an array with many more columns than rows, the length of which is much larger than its width. In this latter event, the positions of the mirrors, as determined by their associated addressing facilities, may be altered so that the reflected light prints characters in quasi-line-at-a-time fashion on a photosensitive drum. See commonly assigned U.S. Pat. Nos. 5,101,236 and 5,04 1,851. In both events, and in other use environments, appropriate configurations of mirrors enable DMDs to modulate light in amplitude-dominant or phase-dominant modes.

It has been found convenient to produce integrated addressing circuits monolithically with the mirrors using conventional MOS processing techniques to form the addressing circuits in and on a substrate (e.g., silicon or GaAs) with the mirrors thereabove. The addressing circuits may be planarized and overlain by their respective mirrors to limit light penetration to the circuitry and to minimize the device size. Depending on the device type and the addressing voltages applied, the pixel may be addressed in analog, tristable, or bistable (binary) fashion.

A membrane type DMD SLM includes a metallized polymer membrane stretched over a spacer grid or other support structure. The openings in the grid define modulator cells or elements which comprise an address electrode and a portion of the polymer membrane supported by the spacer grid. The spacer grid effects an air gap or separation between segments of the membrane and the corresponding underlying addressing electrodes. When an address electrode of an address circuit is energized, by applying a bias voltage to the address electrode, the normally flat related membrane segment is curvilinearly deformed out of its normal, unstretched, planar position by electrostatic attraction between the membrane and the address electrode, and into the air gap where it now acts as a miniature spherical mirror. This deformation stores potential energy in the deformed membrane. When the address electrode is de-energized, the potential energy stored by the membrane returns the membrane to its normal flat position. Incident light reflected by each miniature spherical mirror is concentrated into a relatively narrow cone that is rotationally symmetric about the specularly reflected light. The pixel array can, therefore, be associated with a Schlieren stop, which comprises a single, central obscuration having a position and size to block the image of the light source that results from specular reflection by flat or un-modulated pixels. Modulated or spherically deformed pixels direct a circular patch of light onto the plane of the stop; the patch is centered on, but is larger than, the stop's central obscuration and, therefore, traverses a selected direction and reaches a selected site.

Membrane DMDs have also been produced by forming an array of relatively thick, separated, flat mirrors supported on a relatively thin polymer membrane above a silicon or other substrate. The underlying addressing circuits formed on and in the substrate are separated by air gaps from their associated pixels when the latter reside in their normal positions. When an addressing circuit is appropriately energized, its mirror or pixel is displaced or deflected toward the substrate by electrostatic attraction. The mirrors remain flat while the membrane immediately surrounding them stretches to permit the mirrors to deflect up-and-down in piston-like fashion. The resultant displacement pattern produces a corresponding phase modulation pattern for the reflected light. This pattern may be converted into analog intensity variations by Schlieren projection techniques or used as the input transducer for an optical information processor. Further information on membrane type DMDs may be obtained from commonly assigned U.S. Pat. No. 4,441,791.

Beam-type DMDs each comprise a relatively thick (for rigidity) mirror or metal member supported by one or more relatively thin (for compliance), integral beams or springs. Each mirror and its beam(s) is structurally supported above and separated from its associated addressing circuit, and an address or control electrode which is a part of the addressing circuit, by a spacer or support post which supports the beam.

In the absence of a deflecting force applied to the mirror or metal member, the beam maintains the mirror in a normal, generally horizontal position parallel to the substrate. When the address or control electrode is energized by having a voltage applied thereto by the addressing circuitry, a portion of the mirror aligned with the electrode along the lines of the resulting electrostatic field is electrostatically attracted toward the electrode. Cantilever and/or torsional bending occurs preferentially at the thin beam(s). Such bending stores potential energy in the beam(s) associated with a deflected mirror. The stored potential energy, which tends to return the mirror to its normal position, is effective to return the mirror when the control or address electrode no longer attracts it.

While the present invention may prove useful relative to all types of SLM's it finds particular utility with beam-type DMDs. Improper operation of these types of DMD's typically involves one or more mirrors of the array becoming "stuck" and remaining in a fixed position regardless of the operation of the applicable addressing circuits. A mirror may become stuck in either the "on" position, the position whereat incident light is reflected onto a viewing surface, or an "off" position, a position whereat incident light is not reflected onto the viewing surface. Pursuant to the foregoing nomenclature, a mirror or pixel which is stuck in the "on" position will continuously reflect light to the viewing surface as a continuous "bright spot," even when the pixel should be "off", i.e. should be transmitting no light to the viewing surface. Moreover, a mirror or pixel which is stuck in the "off" position will not reflect light to the viewing surface, resulting in a continuous "dark spot," even when the pixel should be "on" and transmitting light to the viewing surface. These undesired, improper, bright and dark spots are referred to herein as "defects."

Detects in DMD displays are, as a minimum, annoying to the viewer. They produce ongoing light or dark regions which persist regardless of visual changes occurring to the remainder of the display. At worst, such defects may prevent the display from presenting meaningful visual information. Due to the manner in which DMD SLM's are manufactured, it is not possible to gain access to pixels which are stuck for purposes of rendering them operative. Moreover, pixels which are properly operative when a DMD SLM display is first put into service may later become stuck. The reverse is also possible, that is, previously stuck mirrors may become unstuck. As a consequence, a method of reducing the visual impact of such defects on the viewer to eliminate annoyance and to ensure that meaningful information is presented, which method can be selectively effected on an as-needed basis, and is one object of the present invention.

SUMMARY

The present invention provides a method and display system for reducing the visual impact of defects present in an image display. The display includes an array of pixels, each non-defective pixel being selectively operable in response to input data by addressing facilities between an "on" state, whereat light is directed onto a viewing surface, and an "off" state, whereat light is not directed onto the viewing surface. A defect is the result of a defective pixel which does not respond to the input data presented by the addressing facilities, typically by continuously remaining in its "on" or "off" state. Each defective pixel is immediately surrounded by a first ring of compensation pixels adjacent to the central defective pixel. The compensation pixels are immediately surrounded by a second ring of reference pixels spaced from the central defective pixel. The addressing circuit-determined value of at least one compensation pixel in the first ring surrounding the defective pixel is changed from its desired or intended value, to a corrective value, in order to reduce the visual impact of the defect.

In one embodiment, the value the compensation pixels is selected such that the average visually defected value for all of the compensation pixels and the defective pixel is equal to the intended value of the defective pixel.

In another embodiment, the values of the compensation pixels are adjusted by adding an offset to the desired value of each compensation pixel. The offset is chosen such that the sum of the offset values is equal to the intended value of the defective pixel minus the visually defected value of the defective pixel.

In still another embodiment, a scaling function based on the sinc function is used to determine the value of, or offset applied to, the compensation pixels.

In a display system according to one embodiment of the present invention, a modulator comprised of an array of pixels including at least one inoperable pixel and at least one compensation pixel adjacent to the inoperable pixel, receives a set of image data values corresponding to the array of pixels and selectively activates the pixels to represent the set of image data values. A processor receives an image signal and, after altering the image data value corresponding to said compensation pixel, outputs the set of image data values to the modulator, thereby compensating for the defective pixel.

BRIEF DESCRIPTION OF THE DRAWINGS

FIG. 1 is a timeline according to the prior art showing one frame period comprised of eight separate sub-frame periods.

FIG. 2 is an array of pixels, having an orthogonal or Manhattan format, showing the location of defective, compensation, and reference pixels.

FIG. 3 is a matrix of intensity values to be displayed on the pixel array of FIG. 2.

FIG. 4 is the matrix of the intensity values of FIG. 3 that has been modified according to one embodiment of the present invention to minimize the impact of a defective pixel.

FIG. 5 is the matrix of the intensity values of FIG. 3 that has been modified according to one embodiment of the present invention to minimize the impact of a defective pixel.

FIG. 11 is the matrix of the intensity values of FIG. 3 that has been modified according to one embodiment of the present invention to minimize the impact of a defective pixel.

FIG. 12 is the matrix of the intensity values of FIG. 3 that has been modified according to one embodiment of the present invention to minimize the impact of a defective pixel.

FIG. 13 is a matrix of intensity values having an intensity gradient that are to be displayed on the pixel array of FIG. 2.

FIG. 14 is the matrix of the intensity values of FIG. 13 that has been modified according to one embodiment of the present invention to minimize the impact of a defective pixel.

FIG. 15 is the matrix of the intensity values of FIG. 13 that has been modified according to one embodiment of the present invention to minimize the impact of a defective pixel.

FIG. 16 is the matrix of the intensity values of FIG. 13 that has been modified according to one embodiment of the present invention to minimize the impact of a defective pixel.

FIG. 17 is the matrix of the intensity values of FIG. 13 that has been modified according to one embodiment of the present invention to minimize the impact of a defective pixel.

FIG. 18 is an orthogonal array of pixels showing one possible correspondence between reference pixels and compensation pixels according to one embodiment of the present invention.

FIG. 19 is the matrix of the intensity values of FIG. 13 that has been modified according to one embodiment of the present invention to minimize the impact of a defective pixel.

FIG. 20 is the matrix of the intensity values of FIG. 13 that has been modified according to one embodiment of the present invention to minimize the impact of a defective pixel.

FIG. 21 is an orthogonal array of pixels showing another possible correspondence between reference pixels and compensation pixels according to one embodiment of the present invention.

DETAILED DESCRIPTION

Figures 6, 7, 8, 9, 10:
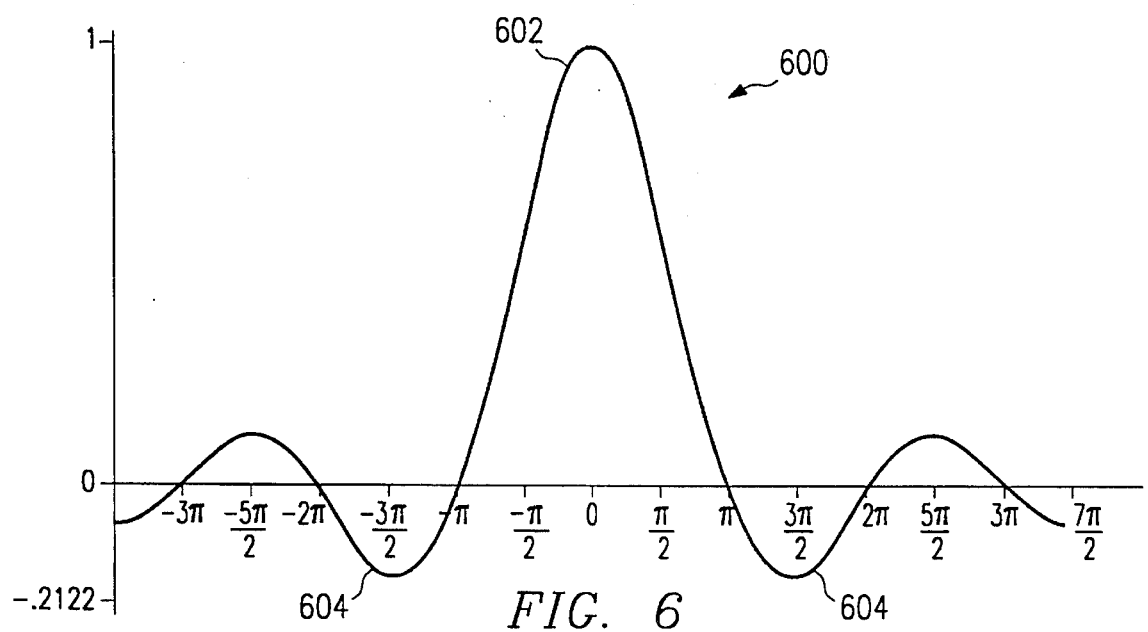
FIG. 6 is a plot of the sinc function.
FIG. 7 is the matrix of the intensity values of FIG. 3 that has been modified according to one embodiment of the present invention to minimize the impact of a defective pixel.
FIG. 8 is the matrix of the intensity values of FIG. 3 that has been modified according to one embodiment of the present invention to minimize the impact of a defective pixel.
FIG. 9 is the matrix of the intensity values of FIG. 3 that has been modified according to one embodiment of the present invention to minimize the impact of a defective pixel.
FIG. 10 is the matrix of the intensify values of FIG. 3 that has been modified according to one embodiment of the present invention to minimize the impact of a defective pixel.

In one type of DMD display, multiple video images are projected, typically at the rate of 50 to 60 frames per second, in order to give a viewer the effect of true motion. Each frame represents a complete "snapshot" or "frame-grab" of the image being displayed. As discussed earlier, the DMD elements or mirrors of a bistable DMD modulator may only assume one of two positions, on or off, and the duty cycle of each modulator element within a frame is modulated in order to project gray scale images. Typically this is done by dividing each frame period 100 into multiple sub-frame or "bit-plane" periods 102, 104, 106, 108 as shown in FIG. 1. Generally, the data displayed during each bit-plane within a frame is unique. The eye and brain of the viewer tend to integrate the multiple bit-planes to create a frame, much the same way that multiple frames are integrated to achieve the effect of full-motion video.

The simplest way to produce bit-planes from a binary-encoded word representing the desired intensity of a pixel, or intensity word, is to use each bit of the intensity word to create one bit-plane. Each bit will then control the position of the mirror for one sub-frame or bit-plane. Generally, the time each bit of the intensity word controls the mirror position is doubled for each increase in bit significance. For example, the most significant bit is displayed during sub-frame 102, the next most significant bit is displayed during sub-frame 104, the period of which is half as long as the period of sub-frame 102. Each successive sub-frame is displayed for half the period of the previous sub-frame until all the sub-frames have been displayed. This causes the integrated displayed intensity to be a linear representation of the intensity word. One sample time-line for an eight-bit display system is shown in FIG. 1. Throughout this discussion intensity data values will be represented as eight-bit values, but it should be understood that the methods taught herein are equally applicable to other word lengths. Although FIG. 1 shows the sub-frames displayed in order from the most significant 102 to the least significant 108, practical systems typically do not display the data bits in descending order, nor is each sub-frame period necessarily contiguous. For example, in some display systems, portions of multiple bit planes are displayed simultaneously such that at any given time, different portions of the array are displaying data bits of various significance. Further information on splitting bit-planes is contained in commonly assigned U.S. Pat. No. 5,278,652.

Specifically, assume that a selected mirror or pixel has, during a frame period, the following positions: on, on, off, off, off, on, off, on. This sequence of positions can be represented by the eight bit binary number 11000101 having a decimal equivalent of 197. The number 197 may be thought of as the grey scale value of the pixel as evaluated by the human eye/brain during the frame. If this same pixel is stuck on, the defect produced thereby will have a continuous grey scale frame value of 255; if it is stuck off, the defect's value will be 0.

Study and analysis of DMD displays have produced some significant observations. First, amelioration of the effect of defects can occur when the condition, on or off, of a mirror in the vicinity of an improperly operating mirror is appropriately adjusted to lessen the visual effect of the defect.

One of the easiest ways of ameliorating the effects of the stuck pixel, or defective pixel 202, in an array of pixels 200 shown in FIG. 2, is to use the pixels 204 surrounding the defective pixel 202 to compensate for the increase, or decrease, in light reflected from the defective pixel 202. For example, assume that the desired intensity for each pixel shown in FIG. 2 is equal to the corresponding intensity value shown in the matrix of FIG. 3. In the case shown by FIG. 3, the intended intensity value of every pixel is 180. If the intended intensity of the defective pixel 202 was 180, as shown by element C3 in FIG. 3, but pixel 202 was stuck on (intensity=255), there are 75 bit periods of excess light in each frame of the display. To reduce the excess light, each of the 8 pixels 204 surrounding the defective pixel 202 is reduced by 9 bit periods, as in the matrix of actual intensity values shown in FIG. 4. This results in the total light from the defective pixel 202 and the 8 surrounding pixels 204 being only 3 LSB periods too great as opposed to the original 75 periods. Because the 8 pixels 204 surrounding the defective pixel 202 were used to compensate for the defective pixel 202, the 8 pixels 204 are referred to as the compensation pixels 204. FIG. 5 shows the intensity values that are displayed if pixel C3 is stuck off.

In an attempt to ascertain what value imposed on the compensation pixel best operates to ameliorate the effect of a defective pixel, analogies were drawn between averaging and the operation of electrical low pass filters, which perform a type of averaging. Various averaging techniques derived from the type of averaging performed by low pass filters were applied to pixel frame values. An effective low pass filter is one which has a so-called sinc function characteristic, that is, the characteristic response which is congruent with the function generated by low pass filtering a unit impulse, which is given by:

$$Y = (\sin X)/(X),$$

and is shown in FIG. 6, where Y is the magnitude of the response and X represents the distance from the defective pixel 202. The sinc function waveform 600 is characterized as having a central curvilinear portion 602 with a value of 1 and generally symmetrical, positive- and negative-going, damped portions 604 on either side thereof. It was felt that the damped side portions 604 might be related to an appropriate value to be assumed by the compensation pixel. Indeed, it was found that an approximation of the damped side portions is related to a "compensation" value which, if assigned to the compensation pixel 204, would offset the difference between the actual and desired intensity values of the defective pixel 202, or in the alternative, between the actual intensity value of the defective pixel 202 and the intensity value of one or more nearby reference pixels 206 so as to ameliorate the constantly on or constantly off, defective pixel 202. The application of this technique and its refinement is another object of the present invention.

To relate the sinc function to a matrix of pixels, the distance between orthogonally adjacent pixels is set equal to $3\Pi/2$ radians. As shown in FIG. 6, for orthogonally adjacent compensation pixels, $X=3\Pi/2$ radians and the function evaluates to $-0.2122$. For diagonally adjacent compensation pixels, $X=2^{1/2}3\Pi/2$ radians and the function evaluates to $0.0558$.

There are many ways of implementing a sinc function-shaped correction. The simplest method does not require knowledge of the desired intensity of either the compensation pixels 204 or the reference pixels 206. According to this first method, the unit impulse response (Y=1) is assumed to be proportional to the difference between the actual intensity of the defective pixel and the desired intensity of the reference pixel. The intensity of the compensation pixels is then determined according to the following formula:

$$X = A(B-C) + C$$

where X is the intensity value assigned to the compensation pixel 204, A is the value of the sinc function evaluated for the compensation pixel, B is the actual intensity value of the defective pixel 202, and C is the desired intensity value of the defective pixel 202. For orthogonally adjacent compensation pixels $A=-0.2122$, for diagonally adjacent compensation pixels $A=0.0558$. FIG. 7 is a matrix of the actual intensity values displayed an array of pixels that have the desired intensity shown in FIG. 3 when pixel C3 is stuck on. FIG. 8 is the matrix of FIG. 7 when pixel C3 is stuck off. In FIG. 7, the average intensity displayed by the 8 compensation pixels 204 and the defective pixel 202 is 183 compared to the desired intensity of 180. In FIG. 8, the average intensity is 179.6 compared to the desired intensity of 180.

As can be seen in FIGS. 7 and 8, the intensity value assigned to the diagonally adjacent compensation pixels is very close to the intended intensity value of the compensation pixels. Therefore, the diagonally adjacent compensation pixels contribute very little to the compensation of the defective pixel 202. It is possible to reduce the amount of processing power required and still achieve approximately the same compensation effect by only adjusting the intensity values of the four orthogonally adjacent compensation pixels. FIGS. 9 and 10 show the actual displayed intensity values for the matrix of FIG. 3 when only the four orthogonally adjacent pixels are used to compensate for a defective pixel 202 that is stuck on (FIG. 9) or off (FIG. 10).

An alternate method of compensating for a defective pixel according to the present invention uses the same intensity value for each of the 8 compensation pixels 204. According to this method, the diagonally adjacent compensation pixels are assigned the same value as the orthogonally adjacent compensation pixels. This method provides 8 compensation pixels 204 and only requires the calculation of one compensation value. FIGS. 11 and 12 show the actual displayed intensity values, according to this method, for the matrix of FIG. 3 when pixel C3 is stuck on (FIG. 11) or off (FIG. 12).

While the method thus far determined the value of a compensation pixel by using only the intended or desired intensity value of a defective pixel 202 and the actual displayed intensity value of the defective pixel 202, a second method involves using the actual displayed intensity and the desired intensity of the defective pixel 202 to determine an offset value which is applied to the compensation pixels 204. While any of the options taught above regarding adjacent and orthogonal compensation pixels 204 may be used in the methods that follow, the examples illustrated will assume that all 8 compensation pixels 204 are treated as orthogonally compensation pixels. The difference between the first and second methods is that whereas in the first method the value assigned to the compensation pixels 204 was determined solely by the desired and actual values of the defective pixel 202, the second method according to the present invention determines an offset based on the desired and actual values of the defective pixel 202 and adds this offset to the desired value of the compensation value according to the following formula:

$$X_n = A(B-C) + D_n$$

where $X_n$ is the intensity value assigned to the compensation pixel 204, A is the value of the sinc function evaluated for the compensation pixel (−0.2122 in this example), B is the actual intensity value of the defective pixel 202, C is the desired intensity value of the defective pixel 202, and $D_n$ is the desired value of the compensation pixel.

This second method has the advantage of not losing the image information contained in the original intensity value set. While the loss of the information contained in the original compensation intensity values does not alter the displayed image when the desired value for all of the pixels is equal, as in FIG. 3, the loss does degrade an image that contained an intensity "edges" or intensity "contour" as shown in FIG. 13, especially if the intensity contour was accompanied by image motion between successive image of a video display system. FIGS. 14 and 15 show the actual displayed intensity values for the matrix of FIG. 13 when the 8 compensation pixels are offset according to the above formula to compensate for a defective pixel 202 that is stuck on (FIG. 14) or off (FIG. 15). As shown in FIGS. 14 and 15, the compensation pixels 204 maintain the original intensity contour while being offset to compensate for the defective pixel 202. In FIG. 14, the intensity value of each compensation pixel 204 is decreased 27 while in FIG. 15, the intensity value of each compensation pixel 204 is increased 27.

A third method according to the present invention uses the surrounding reference pixels 206, that is pixels A1 through A5, B1, B5, C1, C5, D1, D5, and E1 through E5, to calculate either the value of the compensation pixels, or an offset for the compensation pixels 204. To assign a value to the compensation pixels, the following formula is used:

$$X = A(B-C) + D$$

where X is the intensity value assigned to the compensation pixel 204, A is the value of the sinc function evaluated for the compensation pixel (−0.2122 in this example), B is the actual intensity value of the defective pixel 202, C is the average value of the 16 reference pixels 206, and D is the desired intensity value of the defective pixel 202. To compensate for a defective pixel 202 by offsetting the compensation pixels, the following formula is used:

$$X_n = A(B-C) + D_n$$

where $X_n$ is the intensity value assigned to the compensation pixel 204, A is the value of the sinc function evaluated for the compensation pixel (−0.2122 in this example), B is the actual intensity value of the defective pixel 202, C is the average value of the reference pixels 206, and $D_n$ is the desired value of the compensation pixel. An alternative to this third method uses the average value of the 16 reference pixels 206 and the desired value of the defective pixel 202 in place of "C" in the above formulas to determine the value of the compensation pixels. FIGS. 16 and 17 show the actual displayed intensity values for the matrix of FIG. 13 and the 8 compensation pixels 204 are offset according to the above formula, thereby compensating for a defective pixel 202 that is stuck on (FIG. 16) or off (FIG. 17). In FIG. 16, the intensity value of each compensation pixel 204 is decreased 20 while in FIG. 17, the intensity value of each compensation pixel 204 is increased 34.

Although the embodiments taught above help to preserve information from the original compensation pixels 204. It still has a tendency to lose information contained in the compensation pixels 204 when there is a significant intensity contour or edge in the displayed image. FIG. 13 shows the desired intensity values for an orthogonal array of pixels 1200 displaying a sharp intensity change between columns 3 or 4. When pixel C3 is stuck on, the previous algorithm calls for decreasing all of the compensation pixels 204 by 20. Because of the distinct edge between columns 3 and 4, averaging all of the reference pixels 206 results in decreasing compensation pixels 204 B2, B3, C2, D2, and D3 too little, and decreasing compensation pixels 204 B4, C4, and D4 too much.

A fourth method according to the present invention of compensating for defective pixels 102 while preserving edges and contours that may be present in the original intensity value data set involves the use of only a portion of the reference pixels 206 when calculating the value or offset for an individual compensation pixel 204. As shown in FIG. 18, a first method uses only the reference pixel 1806 that is opposite the defective pixel 1802 with respect to each compensation pixel 1804. For example, only the value of reference pixel 1806 A3 is used to determine the value of compensation pixel 1804 B3. Each arrow 1808 in FIG. 18 leads from a reference pixel 1806 to a compensation pixel 1804 that is modified by the reference pixel 1806. Application of this first method to the intensity data set shown in FIG. 13 results in the values shown for the compensation pixels 204 shown in FIG. 19 when pixel C3 is stuck on, and shown in FIG. 20 when pixel C3 is stuck off.

Although the above example used only a single reference pixel to derive the intensity value of a compensation pixel 204, any number of pixels may be used. One example is shown in FIG. 21 which once again uses arrows 2108 to point from a reference pixel 2106 to a compensation pixel 2104 that it modifies. As shown in FIG. 15, the intensity value of each compensation pixel depends on the value of three reference pixels 2106. Many other groups of reference pixels 2106 may be used to compensate the intensity value of the compensation pixels 2104, including methods that use as reference pixels those pixels in the area surrounding the reference pixels 2106, without departing from the methods taught herein.

Figures 22, 23:
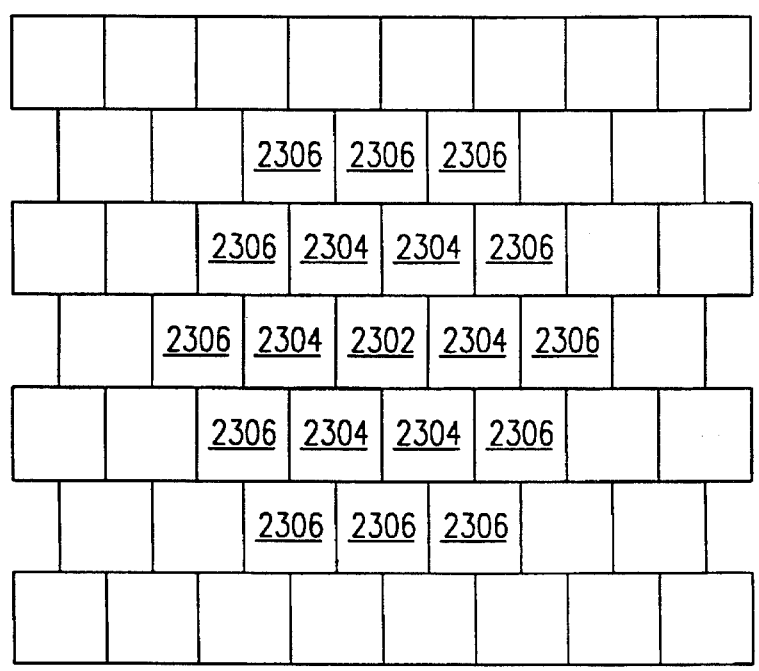
FIG. 22 is a matrix of intensity values that has been modified according to one embodiment of the present invention to minimize the impact of three defective pixels.
FIG. 23 is an array of pixels, having a staggered, cardinal or brick format, showing the location of defective, compensation, and reference pixels.

While the preceding examples have shown the compensations of the effects of defective pixels 202 that are isolated, it should be understood that the same compensations techniques may be used for multiple defective pixels that are nearby or even adjacent to each other. For example, assume that an image is comprised of a 6×8 array of pixels each with a desired intensity value of 180. FIG. 22 shows the actual intensity values displayed assuming pixel C3 is stuck on and pixels D5 and C6 are stuck off. According to the present invention, an offset of −17 is used to compensate for pixel C3 and an offset of +38 is used to compensate for pixels D5 and C6. Pixels C4 and D4 are used to compensate for both pixels C3 and D5. Therefore pixels C4 and D4 have a net offset of +22 added to the desired intensity value of 180. Pixels C5 and D6 are used to compensate for both pixels D5 and C6, and therefore have a net offset of +76 added to the desired intensity value of 180. Because the examples herein have assumed an 8-bit intensity data word which has a maximum intensity value of 255, the actual intensity value displayed by pixels C5 and D6 is 255 instead of the calculated value of 256.

The compensation techniques taught herein are not restricted to the compensation of defective pixels in an orthogonal pixel array, but rather, the techniques may be easily modified and applied to a pixel array of any form. For example, the pixel array 2300 of FIG. 23 has rows of pixels that are staggered or shifted by one-half pixel. This form of array is commonly referred to by several names including: brick-, staggered-, and cardinal-array. In FIG. 23, pixel 2302 is assumed to be defective. According to the present invention, the pixels surrounding the defective pixel 2302 are the compensation pixels 2304, and the pixels surrounding the compensation pixels 2304 are the reference pixels 2306.

Figure 24:
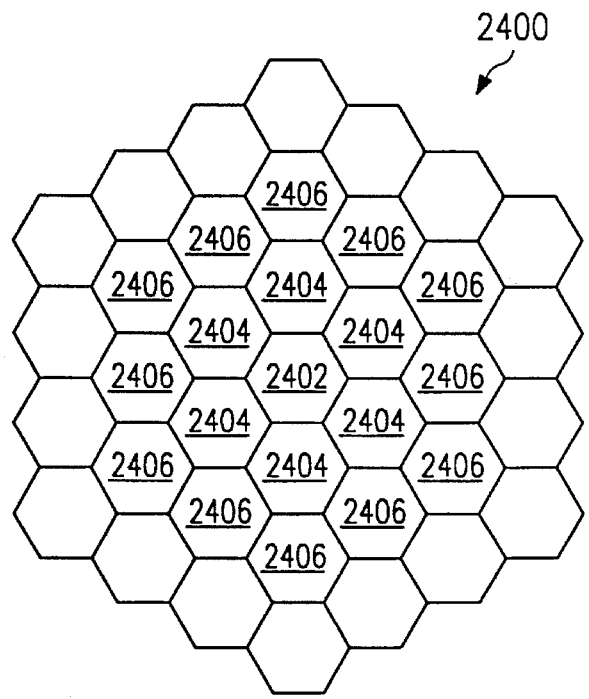
FIG. 24 is an array of pixels, having a hexagonal format, showing the location of defective, compensation, and reference pixels.

A second form of pixel array that may benefit from the methods taught herein is an array comprised of non-rectangular pixels, for example the array of hexagonal pixels 2400 shown in FIG. 24. In FIG. 24, pixel 2402 is assumed to be defective. Once again, the pixels surrounding the defective pixel 2402 are the compensation pixels 2404, and the pixels surrounding the compensation pixels 2404 are the reference pixels 2406/

Figure 25:
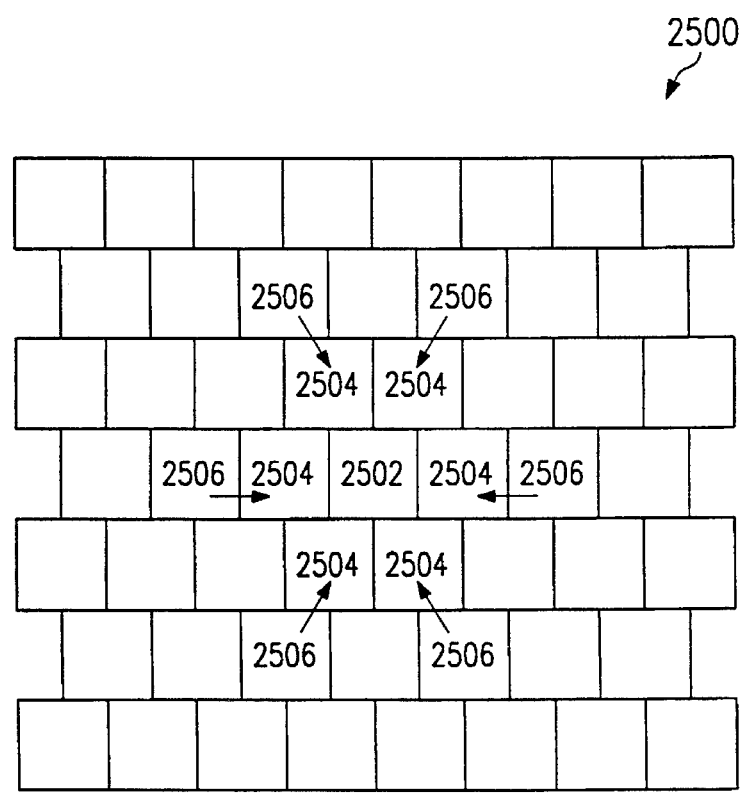
FIG. 25 is an staggered array of pixels showing one possible correspondence between reference pixels and compensation pixels according to one embodiment of the present invention.
Figure 26:
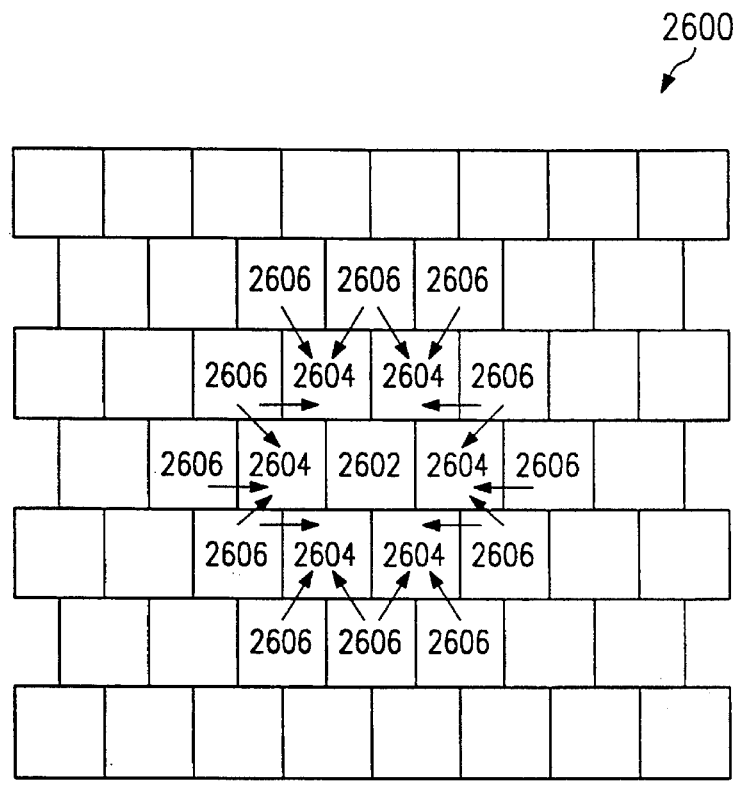
FIG. 26 is an staggered array of pixels showing another possible correspondence between reference pixels and compensation pixels according to one embodiment of the present invention.
Figure 27:
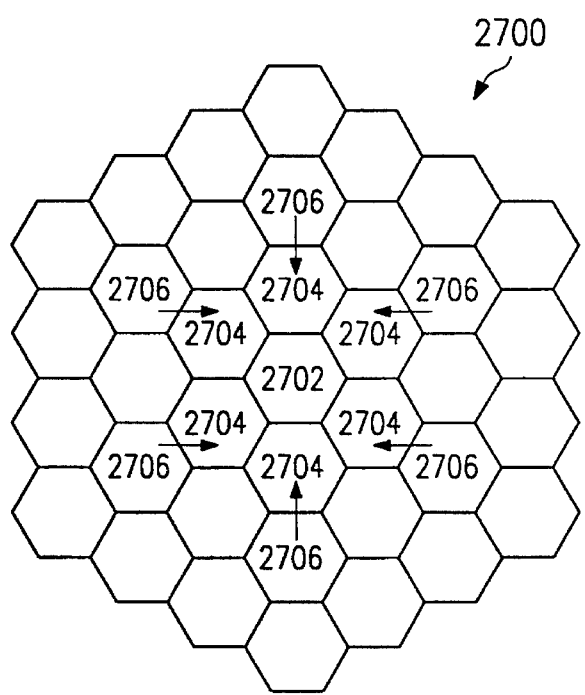
FIG. 27 is an hexagonal array of pixels showing one possible correspondence between reference pixels and compensation pixels according to one embodiment of the present invention.
Figure 28:
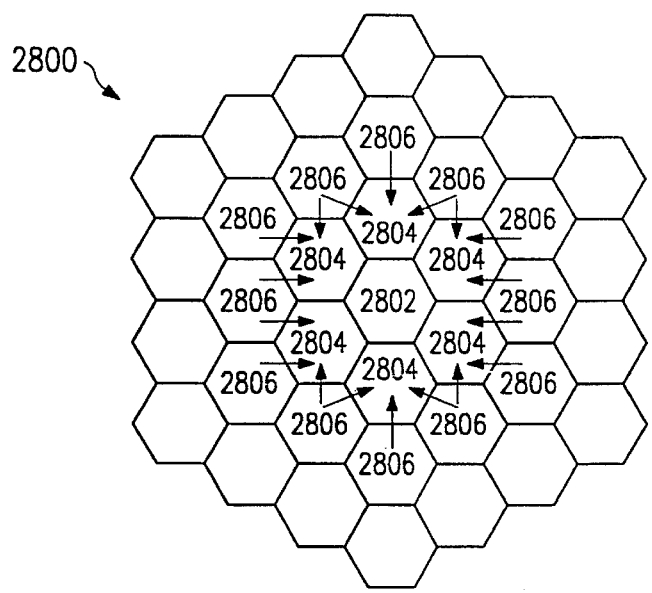
FIG. 28 is an hexagonal array of pixels showing another possible correspondence between reference pixels and compensation pixels according to one embodiment of the present invention.

The use of a subset of the reference pixels 206 to determine the offset for a compensation pixel 204, as taught herein, may easily be applied to non-orthogonal pixel grids as shown in FIGS. 25 through 28. On each of FIGS. 25 through 28, arrows identify the reference pixels, associated with each of the compensation pixels. FIG. 25 shows a staggered array of pixels 2500 wherein one reference pixel 2506 is used to determine the offset applied to each compensation pixel 2504. FIG. 26 shows a staggered array of pixels 2600 wherein three reference pixels 2606 are used to determine the offset applied to each compensation pixel 2604. FIG. 27 shows a hexagonal array of pixels 2700 wherein one reference pixel 2706 is used to determine the offset applied to each compensation pixel 2704. FIG. 28 shows a hexagonal array of pixels 2800 wherein three reference pixels 2806 are used to determine the offset applied to each compensation pixel 2804. As stated above, many other arrangements of reference and compensation pixels are possible without departing from the present invention.

Although the examples used to describe the present invention have thus far referred to the defective pixel as being either stuck on or stuck off, it should be understood that the present invention is also used to compensate for defective or inoperable pixels whose output may be between fully on and fully off. For example, a light emitting diode (LED) or liquid crystal device (LCD) display may include some pixels that cannot be fully illuminated or darkened, perhaps due to leakage currents in the underlying addressing circuitry. The adjacent pixels are then used to compensate for the operable or defective pixel as described above.

Figure 29:
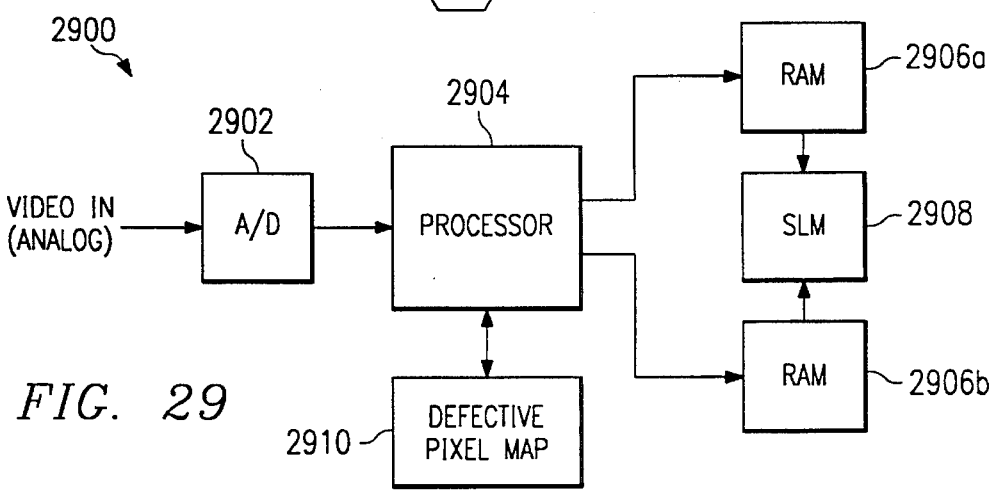
FIG. 29 is a block diagram of a display system according to one embodiment of the present invention.

FIG. 29 is a schematic representation of one example of a display system 2900 according to the present invention. Analog video data is sampled by an analog-to-digital converter 2902 and passed to a processor 2904. The processor 2904 performs many functions such as data conditioning, gamma correction, deinterlacing, and data formatting, all of which are known in the prior art. In addition to the existing functions performed by the processor 2904, the processor 2904 also calculates and applies the offsets to the compensation pixels according to the present invention. The compensated digital video data is then stored in RAM 2906a, 2906b before being driven onto SLM 2908.

To compensate for the defective pixels 202, the processor 2904 may use any of the algorithms suggested herein. Which algorithm is selected depends primarily on the amount of processing throughput available and the types of images being displayed. For example, the processor may select an algorithm that uses all of the reference pixels 206 to determine a common value for the compensation pixels when there is image motion in the vicinity of the defective pixel. This algorithm does not require much processing power to implement which is an advantage because the processing power required by other processes may increase when there is scene motion. Furthermore, because the human eye loses a lot of resolution when there is motion in the scene, the viewer is less likely to defect any defects that are generated by a simple compensation algorithm.

Figure 30:
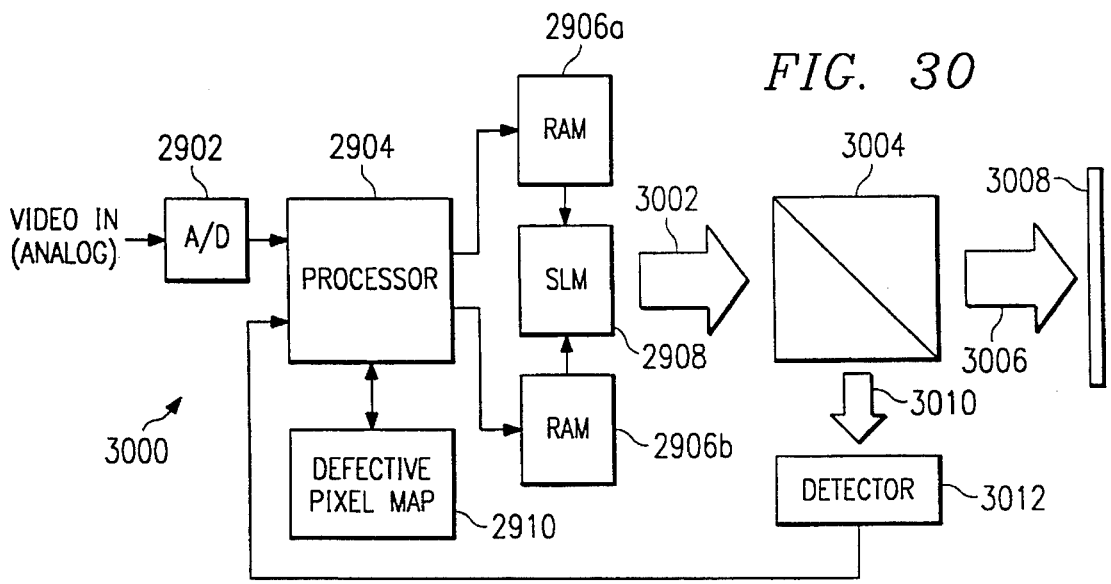
FIG. 30 is a block diagram of a display system according to one embodiment of the present invention including an optical projection path and an optical defector in a feedback path.

The processor determines which pixels are defective by reading the contents of the defective pixel map 2910. The locations of the defective pixels 202 may be stored in the defective pixel map 2910 when the display is assembled. However, as mentioned above regarding DMDs, there is a tendency for pixels to either become unstuck, or to become stuck, during the operation of the DMD. Compensation of intermittently defective pixels requires that the defective pixel map 2910 be periodically updated to include the locations of all pixels that are currently defective. A system that is capable of monitoring the operational condition of the pixels is shown in FIG. 30. In FIG. 30, the light 3002 from the SLM 2908 passes through a beamsplitter 3004 which allows the majority of the light 3006 to pass through to display screen 3008. A small portion of the light 3010 is directed by the beam splitter 3004 toward the defector 3012. In a first defection embodiment, defector 3012 is a defector array that has a one- to-one correspondence between defector pixels and SLM pixels. By monitoring the output of the defector array 3012, while images were being displayed, the processor 2904 determines which pixels are defective. While this embodiment uses an expensive defector array 3012, it allows defection of defective pixels in a single image frame. An alternative to a system 3000 using a defector array 3012 uses a single defector element 3012 to measure the light from the entire image. In this second defection embodiment, the processor 2904 must monitor many frames to data to deduce which pixels are stuck. This second embodiment has the disadvantage of using a lot of processing power to defect the defective pixels. A third embodiment uses a single defector element 3012 to locate defective pixels by displaying a dedicated sequence of video test frames. These test frames may be interspersed with the actual image frames at a slow enough rate to be undefectable by the viewer. In television systems, the test frames may be inserted during channel changes. Alternatively, the test frames may be displayed during a self-test routine that is executed whenever the system is turned on prior to displaying actual image data.

Using a beamsplitter 3004 to direct a portion of the light 3010 to the defector has the disadvantage of reducing the amount of light 3006 that is directed toward the screen 3008. To avoid reducing the light 3006 directed toward the screen 3008, the beamsplitter 3004 may be eliminated and the defector 3012 positioned so as to defect light reflected from the screen 3008.

Thus, although there has been disclosed to this point a particular embodiment for a method of reducing the visual impact of defects present in a spatial light modulator display, it is not intended that such specific references be considered as limitations upon the scope of this invention except insofar as set forth in the following claims. Furthermore, having described the invention in connection with certain specific embodiments thereof, it is to be understood that further modifications and permutations may now suggest themselves to those skilled in the art, it is intended to cover all such modifications and permutations as fall within the scope of the appended claims.

What is claimed is:

1. A method of reducing the visual impact of defects present in an image display, the display being of the type which includes an array of pixels, each non-defective pixel being selectively operable, in response to input data provided by addressing facilities between an "on" state in which light is directed onto a viewing surface, and an "off" state in which light is not directed onto the viewing surface; a defect being the result of a defective pixel which continuously remains in the "on" or "off" state regardless of the input data or the operation of the addressing facilities; each defective pixel being, in effect, a central defective pixel immediately surrounded by a first ring of compensation pixels adjacent to the central defective pixel with the first ring of compensation pixels being immediately surrounded by a second ring of reference pixels spaced from the central defective pixel; wherein the method comprises:

(a) identifying a defect-producing defective pixel; and (b) changing the addressing circuit-determined value of at least one compensation pixel in the first ring surrounding the defective pixel to a corrective value given by:

$$C_{NEW} = C_{SINC}(D_{ACT} - D_{INT}) + D_{INT}$$

wherein $C_{NEW}$ is the intensity value assigned to the compensation pixel, $C_{SINC}$ is the value of the sinc function evaluated for the compensation pixel, $D_{ACT}$ is the actual intensity value of the defective pixel, and $D_{INT}$ is the intended intensity value of the defective pixel.

2. A method as in claim 1, wherein:

step (a) is effected by comparing the actual light directed onto the viewing screen by the defective pixel and the addressing circuit-determined value of the defective pixel.

3. A method as in claim 1, wherein all compensation pixels are assigned the same value.

4. A method as in claim 1, wherein the location of the defective pixels is stored in a memory.

5. A method of reducing the visual impact of defects present in an image display, the display being of the type which includes an array of pixels, each non-defective pixel being selectively operable, in response to input data provided by addressing facilities, between an "on" state in which light is directed onto a viewing surface, and an "off" state in which light is not directed onto the viewing surface; a defect being the result of a defective pixel which continuously remains in the "on" or "off" state regardless of the input data or the operation of the addressing facilities; each defective pixel being, in effect, a central defective pixel immediately surrounded by a first ring of compensation pixels adjacent to the central defective pixel with the first ring of compensation pixels being immediately surrounded by a second ring of reference pixels spaced from the central defective pixel; wherein the method comprises:

(a) identifying a defect-producing defective pixel; and (b) changing the addressing circuit-determined value of at least one compensation pixel in the first ring surrounding the defective pixel to a corrective value to thereby reduce the visual impact of the defect, the corrective value given by:

$$C_{NEW} = C_{SINC}(D_{ACT} - R_{AVG}) + D_{INT}$$

where $C_{NEW}$ is the intensity value assigned to the compensation pixel, $C_{SINC}$ is the value of the sinc function evaluated for the compensation pixel, $D_{ACT}$ is the actual intensity value of the defective pixel, $R_{AVG}$ is the average value of at least one reference pixel, and $D_{INT}$ is the desired intensity value of the defective pixel.

6. A method as in claim 5, wherein all compensation pixels are assigned the same value.

7. A method as in claim 5, wherein:

$D_{INT}$, the desired intensity value of the defective pixel, is replaced by $C_{ORG}$, the original value of the compensation pixel.

8. A method as in claim 5, wherein:

$R_{AVG}$ the average value of at least one reference pixel and the desired value of the defective pixel.

9. A method as in claim 8, wherein all compensation pixels are assigned the same value.

10. A method as in claim 5, wherein:

step (a) is effected by comparing the actual light directed onto the viewing screen by the defective pixel and the addressing circuit-determined value of the defective pixel.

11. A method as in claim 5, wherein the location of the defective pixels is stored in a memory.

12. A display system comprising:

a modulator comprised of an array of pixels including at least one defective pixel, at least one compensation pixel adjacent to the defective pixel, and at least one reference pixel adjacent to said at least one compensation pixel and spaced apart from said defective pixel, the modulator for receiving a set of image data values corresponding to the array of pixels and for selectively activating the pixels to represent the set of image data values; and a processor for receiving an image signal and outputting the set of image data values to the modulator, wherein the processor alters the image data value corresponding to the compensation pixels according to the following:

$$C_{NEW} = C_{SINC}(D_{ACT} - D_{INT}) + D_{INT}$$

where $C_{NEW}$ is the image data value assigned to the compensation pixel, $C_{SINC}$ is the value of the sinc function evaluated for the compensation pixel, $D_{ACT}$ is the actual intensity value of the defective pixel, and $D_{INT}$ is the desired intensity value of the defective pixel.

13. A display system as in claim 12, further comprising a memory containing the locations of the defective pixels, wherein said memory communicates the locations of the defective pixels to the processor.

14. A display system as in claim 12, further comprising a means for defecting the locations of the defective pixels, wherein said means for defecting communicates the locations of the defective pixels to the processor.

15. A display system as in claim 14, wherein the means for defecting the locations of the defective pixels is a camera.

16. A display system as in claim 12, wherein the processor assigns all compensation pixels the same image data value.

17. A display system comprising:

a modulator comprised of an array of pixels including at least one defective pixel, at least one compensation pixel adjacent to the defective pixel, and at least one reference pixel adjacent to said at least one compensation pixel and spaced apart from said defective pixel, the modulator for receiving a set of image data values corresponding to the array of pixels and for selectively activating the pixels to represent the set of image data values; and a processor for receiving an image signal and outputting the set of image data values to the modulator, wherein the processor alters the image data value corresponding to the compensation pixels according to the following:

$$C_{NEW}=C_{SINC}(D_{ACT}-R_{AVG})+D_{INT}$$

where $C_{NEW}$ is the image date value assigned to the compensation pixel, $C_{SINC}$ is the value of the sinc function evaluated for the compensation pixel, $D_{ACT}$ is the actual intensity value of the defective pixel, $R_{AVG}$ is the average value of at least one of the reference pixels, and $D_{INT}$ is the desired intensity value of the defective pixel.

18. A display system as in claim 17, wherein:

$D_{INT}$, the desired intensity value of the defective pixel, is replaced by $C_{ORG}$, the original value of the compensation pixel.

19. A display system as in claim 17, wherein:

$R_{AVG}$ the average value of at least one reference pixel and the desired value of the defective pixel.

20. A display system as in claim 17, further comprising a memory containing the locations of the defective pixels, wherein said memory communicates the locations of the defective pixels to the processor.

21. A display system as in claims 17, further comprising a means for defecting the locations of the defective pixels, wherein said means for defecting communicates the locations of the defective pixels to the processor.

22. A display system as in claim 17, wherein the means for defecting the locations of the defective pixels is a camera.

23. A display system as in claim 17, wherein the processor assigns all compensation pixels the same image data value.

\* \* \* \* \*